United States Patent [19]

Martyak et al.

[11] Patent Number: 5,277,817
[45] Date of Patent: Jan. 11, 1994

[54] APPARATUS AND METHODS FOR TREATING ELECTROLESS PLATING BATHS

[75] Inventors: Nicholas M. Martyak, Ballwin; Bruce F. Monzyk, Maryland Heights; Henry H. Chien, St. Louis, all of Mo.

[73] Assignee: Monsanto Company, St. Louis, Mo.

[21] Appl. No.: 979,514

[22] Filed: Nov. 20, 1992

[51] Int. Cl.$^5$ .................. B01D 11/00; B01D 61/00
[52] U.S. Cl. ..................... 210/634; 210/638; 210/639; 210/651; 210/652; 210/912
[58] Field of Search ............... 210/634, 638, 639, 650, 210/651, 652, 912, 670; 423/23

[56] References Cited

U.S. PATENT DOCUMENTS

| | | | |
|---|---|---|---|
| 4,755,298 | 7/1988 | Grinstead | 210/651 |
| 4,895,661 | 1/1990 | Cadotte | 210/651 |
| 4,956,154 | 9/1990 | Magdics et al. | 210/634 |
| 5,041,227 | 8/1991 | Van Eikeren et al. | 210/652 |
| 5,112,392 | 5/1992 | Anderson et al. | 210/670 |
| 5,192,418 | 3/1993 | Hughes et al. | 210/652 |

FOREIGN PATENT DOCUMENTS 44872  5/1981  European Pat. Off.

*Primary Examiner*—Robert A. Dawson
*Assistant Examiner*—Ana M. Fortuna
*Attorney, Agent, or Firm*—Thomas E. Kelley; Mark F. Wachter

[57] ABSTRACT

Apparatus and methods for removing polyvalent by-product anions, e.g. borate and orthophosphate ions, from electroless metal plating baths employing borane or hypophosphite reducing agents and typically comprising monovalent anions or neutral zwitterions as metal chelant and/or counterion. The apparatus and methods of this invention employ (a) solvent extraction to remove metal species for recycle, (b) anion filtration to separate polyvalent anions from neutral zwitterions and monovalent anions and (c) ion exchange units to remove metal and metal chelant species from polyvalent anion-containing waste streams.

3 Claims, No Drawings

APPARATUS AND METHODS FOR TREATING ELECTROLESS PLATING BATHS

Disclosed herein are apparatus and methods for treating electroless metal plating baths, e.g. for removing orthophosphite or borate by-products from purge streams or spent plating baths. Also disclosed are methods and apparatus for recycling materials from such baths and treating baths for disposal.

BACKGROUND OF THE INVENTION

Electroless plating baths typically comprise a metal salt, a chelant for the metal species, a reducing agent for the metal and stabilizers to retard the tendency of the reducing agent to promote reduction and deposition of the metal, e.g. on indiscriminate surfaces or in the bulk solution. In nickel electroless plating baths of the prior art, the nickel salt is typically associated with a divalent counterion such as sulfate. It has been discovered that sulfate ions create problems in treating spent electroless nickel plating baths. For instance, not only are sulfate ions not environmentally acceptable in many effluent streams, but sulfate ions are difficult to separate from desirable polyvalent anions such as chelant species.

Spent plating baths are traditionally treated by adding reducing agent such as sodium borohydride to precipitate elemental metal; residual soluble metal is precipitated with strong complexing agents, e.g. dithiocarbamate. Metal chelant complexes can be decomposed by oxidizing chelants, e.g. with peroxides, hypochlorates or other oxidizing acids.

Because of the difficulties in treating spent plating baths, disposal in landfills is often a method of choice for disposing of spent plating solutions or metal sludge precipitate from plating baths. Typically sulfate is removed from plating solutions by lime treatment forming gypsum contaminated with metal, e.g. nickel, which is not acceptable for disposal in a growing number of landfills. Moreover, metal recyclers often prefer to avoid spent electroless nickel solutions because of the high phosphorus content.

U.S. Pat. No. 5,039,497 discloses methods of removing copper from sulfate solutions using oximes. Cognis, Inc. (Santa Rosa, Calif.) has disclosed that such an extraction process can be used to treat copper and nickel electroless solutions to reduce the metal content producing a solution suitable for disposal, e.g. by sewering. Such solvent extraction methods have not been enthusiastically adopted for treating plating baths comprising copper complexed with EDTA, in part because common commercial extractants such as oximes are not especially effective in extracting metals from complexes. For instance, copper is effectively extracted from EDTA at a pH in the range of 12–12.5, the same pH used for electroless plating; simultaneous plating and extraction is not desirable. Another disadvantage of the proposed extraction is that, because nickel is invariably associated with cobalt, which irreversibly binds to oximes, the extractant is progressively poisoned.

Cardotte in U.S. Pat. No. 4,895,661 discloses the use of hyperfiltration membranes to process copper electroless plating solutions, e.g. to concentrate for re-use salts of EDTA. Such membranes are more permeable to monovalent anions such as formate than polyvalent anions such as tartrate which are often used as chelants in electroless metal plating baths. It has been found that an undesirably high level of metal salts or chelated complexes permeate such membranes when treating plating bath purge streams. Such metal-containing permeate streams are typically unsuitable for waste disposal in many places.

An object of this invention is to provide apparatus and methods for removing polyvalent oxized by-products of reducing agents from metal solutions in streams essentially devoid of metal as to allow environmentally acceptable disposal.

SUMMARY OF THE INVENTION

This invention provides apparatus and methods for removing polyvalent by-product anions, e.g. borate and orthophosphite ions, from electroless metal plating baths employing borane or hypophosphite reducing agents and typically comprising monovalent anions or neutral zwitterions as metal chelant and/or counterion. The apparatus and methods of this invention employ (a) solvent extraction to remove metal species for recycle, (b) anion filtration to separate polyvalent anions from neutral zwitterions and monovalent anions and (c) ion exchange units to remove metal and metal chelant species from polyvalent anion-containing waste streams.

Preferred aspects of this invention provide apparatus and methods for removing orthophosphite and/or borate from electroless nickel plating baths. These and other aspects and advantages of the subject matter of this invention will be apparent from the following detailed description and illustrative examples.

DETAILED DESCRIPTION OF PREFERRED EMBODIMENTS

Electroless metal plating solutions employing hypophosphite, borane or borohydride reducing agents typically comprise water soluble metal salts. The counterion and chelants associated with the dissolved metal species can be polyvalent, monovalent or neutral. Polyvalent counterions can include sulfates; polyvalent chelants can include tartrates. Monovalent counterions can be derived from monovalent acids such as hypophosphorous acid, nitric acid, acetic acid, sulfamic acid, hydrochloric acid, lactic acid, formic acid, propionic acid, trichloroacetic acid, trifluoroacetic acid, methanesulfonic acid, glycolic acid, aspartic acid or pyruvic acid or mixtures thereof. Monovalent chelants can include lactic acid, glutamic acid, pyruvic acid, aspartic acid or glycolic acid. Neutral counterions and chelants can include amino acid zwitterions such as glycine and alanine. The pH of electrolead metal plating solutions using hypophosphite or borane reducing agents typically range from about 4 to 12, generally less than 9, preferably 6 to 8. In some cases the chelant is also employed as the principal counterion; for instance, in nickel electroless plating baths lactic acid can serve the dual purpose of chelant and counterion when nickel lactate is used to prepare or replenish the solution. Similarly, nickel can be electrolytically dissolved in a cell having a cation permeable membrane where nickel cations flow through the membrane into a glycine solution where the zwitterion serves the dual purpose of chelant and counterion.

Metal plating baths also typically comprise stabilizers to retard the tendency of the reducing agent toward promoting unwanted deposition of metal. Stabilizers such as thiourea; amines such as guanidine, dimethylazine, diethylamine, dimethylaminopropylamine, tris(hydroxymethyl)aminomethane, 3-di-methylamino-1-propane and N-ethyl-1,2-dimethylpropylanine; sulfonic acids such as taurine, 2-hydroxy-ethanesulfonic acid, cyclohexylaminoethanesulfonic acid, sulfamic acid and methanesulfonic acid; monocarboxylic acids such as acetic acid and propionic acid; and dicarboxylic acids such as succinic acid, maleic acid and tartaric acid.

As soluble metal ions are reduced concurrently with deposition on a surface, the reducing agent is oxidized, e.g. monovalent hypophosphite or neutral borane is oxidized to divalent orthophosphite or trivalent borate, respectively. As the orthophosphite or borate concentration increases, it is desirable to purge a part of the solution, e.g. corresponding to the volume of solution comprising replenishing amounts of metal and reducing agent used to maintain an effective concentration of those constituents in the solution.

In a preferred aspect of this invention spent plating solutions or purge streams from working plating baths are initially treated by solvent extraction to separate and recycle the metal species. Solvent extraction units typically comprise a series of mixing/settling vessels to provide intimate mixing and subsequent separation of an organic liquid and an aqueous liquid. Multi-staged extraction columns with countercurrent flow provide high efficiency liquid extraction. For example, an aqueous liquid comprising a purge stream from such an electroless nickel plating bath or anion filtration unit is intimately mixed with an organic liquid containing a metal-extractant, e.g. a nickel extractant, typically in kerosene. During intimate mixing of aqueous and organic liquids, metal ions cross the phase boundary into the organic solution as a complex with the extractant. When mixing is stopped the phases spontaneously separate, e.g. in a continuous decanter apparatus. When a number of stages of such mixers and decanters are provided in a series, a high degree of efficiency can be attained, providing a nickel ion-depleted aqueous stream and a nickel-extractant organic stream. In summary solvent extraction units typically comprise means for contacting a metal-containing feed stream with an organic solvent solution and means for separating an organic stream containing metal-extractant complex and an aqueous stream depleted in said metal species.

Effective solvent extraction requires the use of an extractant which exhibits a binding energy in a metal-extractant complex that is greater than the binding energy of the metal ions to the metal-chelant complex species in the plating bath. Except when strong chelants, e.g. EDTA, are used, the bond strength of common metal-chelant complexes is often sufficiently low to allow metal extraction by common extractants, such as alkylated oximes, beta diketones and hydroxyquinolines. Because such common extractants are readily poisoned by trace contaminants such as cobalt, preferred extractants are hydroxamic acids which are advantageously capable of extracting nickel from chelants with faster mass transfer kinetics and higher loadings, e.g. providing nickel concentrates at about 100 g/l, and without cobalt poisoning. Hydroxamic acids are advantageously capable of reversibly complexing with a wide variety of metal that can otherwise poison common extractants. In this regard hydroxamic acids can reversibly complex with cadmium, chromium, cobalt, copper, iron, nickel, silver, tin and zinc. Preferred hydroxamic acids with enhanced hydrolytic stability for cost effective long term use include N-alkyl alkanohydroxamic acids, e.g. N-methyl alkylhydroxamic acids, N-ethyl alkyl hydroxamic acids. Especially preferred are N-ethyl hydroxamic acids disclosed in U.S. patent application Ser. No. 07/890,882. It is generally preferred to reduce the temperature of plating solutions, e.g. to less than 30° C., to increase stability against autocatalytic deposition of metal during solvent extraction operations.

In this method of recycling metal, an organic stream containing metal-extractant complex is contacted with an acid stream to provide an aqueous stream having dissolved therein the metal salt of the stripping acid. When it is desired to recycle recovered metal directly into the plating bath, useful acids include any of the acids corresponding to the counterions preferred for use in the plating bath. for instance, when the nickel is to be recovered for another use or further processing, useful acids can include sulfuric acid, lactic acid or hypophosphorous acid. Due to inadequate phase separation the aqueous acidic metal solution can contain trace amounts of organic solvent and extractant which may adversely affect plating baths if the metal-containing solution is recycled to a plating bath. Such trace amounts of organic solvent can be effectively removed by passing the aqueous solution through a phase coalescer, e.g. a glass fiber bed, or an adsorber, e.g. an activated charcoal bed.

Because solvent extraction processes are seldom 100% effective in removing metal, the metal ion-diminished aqueous raffinate stream from the solvent extraction step may contain sufficient metal, e.g. as metal-chelant complex, to preclude its direct disposal, e.g. in municipal sewerage treatment facilities. Such residual metal-chelant complexes can often be removed by reducing the pH of the metal ion-diminished aqueous stream, e.g. to pH less than 2, to selectively precipitate chelant species, such as tartaric acid, an amino acid such as glycine, which is readily removed by settling, filtration, centrifugation, etc. Removal of such precipitate provides a solution that is more amenable to metal removal by ion-exchange. Trace amounts of metal, e.g. complexed with a weak chelant such as lactate, can be removed by conducting the substantially metal chelant-depleted stream to an ion exchange unit containing a chelating ion exchange resin capable of removing metal ions from a solution in which metal ions are complexed with weak chelant, thereby providing an effluent stream essentially depleted of nickel ions and substantially depleted of chelant species.

Spent plating baths, purge streams from working plating baths or the metal-reduced raffinate from solvent extraction treatment, will contain polyvalent anion species, e.g. byproducts of oxidized reducing agents, e.g. borates or orthophosphites, and, depending on the counterions employed, divalent counterions such as sulfate. In addition such baths will also typically contain neutral zwitterionic and/or monovalent anionic counterions, chelants or reducing agents. Depending on their economic value, it is often desirable to separate such monovalent or neutral counterion, chelant and/or reducing agent from polyvalent by-products, e.g. oxidized reducing agent, or from excess polyvalent counterion, present in the plating bath purge stream. The separation of polyvalent anion species from these neutral zwitterion and/or monovalent anion species can be advantageously effected by anion filtration using porous membranes having anionically functionalized surfaces which are more selectively permeable to neutral and monoanionic solutes and less permeable to polyvalent anionic solutes. Such anion filtration can be effected using porous membranes having a negativelycharged, discriminating layer coated onto a porous support layer. Useful membranes include hyperfiltration membranes comprising a sulfonated, polyvinyl alcohol discriminating layer coated onto a porous polysulfone support layer as disclosed in U.S. Pat. No. 4,895,661 which are currently available from Filmtec Corporation, Minneapolis, Minn. Thus, another aspect of this invention provides methods of maintaining effective concentrations of components of plating solutions, or of treating spent plating solutions, by anion filtration treatment to remove polyvalent anions.

To effect anion filtration an electroless plating baths liquid, preferably initially treated by solvent extraction to substantially reduce the metal concentration is conducted to such a membrane filtration unit under sufficient pressure to effect permeation, resulting in a permeate stream and a residual stream. The concentration of neutral zwitterions and monovalent anions in the permeate stream and residual stream will be essentially the same as in the feed stream. The concentration of residual metal ions will follow the chelant concentration. The concentration of the polyvalent anion species, e.g. borate or orthophosphite, will be lower in the permeate stream and higher in the residual stream than in the feed stream. Multi-staged membrane filtration can provide substantial enhancement of separation efficiency. The permeate stream enriched in neutral zwitterions and/or monovalent anions and depleted in polyvalent anions can be recycled to a plating bath directly or after concentration, e.g. where water is removed by reverse osmosis or evaporation.

The residual stream from anion filtration, or optionally the feed stream prior to anion filtration, can be treated by ion exchange to remove residual metal species to provide the residual stream essentially depleted of metal. Such a metal-free stream of polyvalent anion species can be readily disposed. Such ion exchange unit will contain a chelating ion exchange resin adapted to removing metal ions from solutions in which the metal ions are not too strongly complexed. For instance, nickel complexed with tactic acid is readily extracted using commercial cation exchange resins, e.g. resins functionalized with iminodiacetic acid (IDA) such as Amberlite IRC-718 resin available from Rohm & Haas. When the chelant is strongly bound to the metal such that extraction by an IDA-type resin is not feasible, the entire metal-chelant complex is often charged so that extraction can be effected using an anion exchange resin, e.g. a quaternary ammonium-functionalized resin such as Amberlite IRA-400 available from Rohm & Haas. Alternatively, calcium can be used to precipitate caroxylic acid anions.

When plating baths contain divalent counterions such as sulfate, the sulfate typically follows the course of the other polyvalent anions. When plating baths contain divalent chelant such as tartrate, the preferred initial treatment is solvent extraction followed by a pH reduction to about 3 to provide a partially protonated monovalent tartrate which can pass through an anion filtration membrane for recycle with other monovalent species. Alternatively, tartrate can be separated from orthophosphite or borate in the residual stream from anion filtration by crystallization at low pH using suitable cations such as potassium or ammonium.

While the following examples illustrate the use of various materials in embodiments of plating solutions and methods of this invention, it should be clear from the variety of species illustrated that there is no intention of so limiting the scope of the invention. On the contrary, it is intended that the breadth of the invention illustrated by reference to the following examples will apply to other embodiments which would be obvious to practitioners in the plating arts.

EXAMPLE 1

This example illustrates the solvent extraction of nickel from a nickel electroless plating bath where the nickel was chelated with lactic acid and stabilized with acetic and propionic acids. A purge stream from the plating bath containing 1300 ppm Ni was fed to a ten stage counter-current flow solvent extraction unit comprising ten mixer-settler devices configured for six stages of extraction and four stage of stripping. That is, nickel from an aqueous stream of plating bath solution is extracted into an organic extractant phase in a series of six mixer-settlers; and, nickel is stripped from the organic phase with an acid in a series of four mixer-settlers. The mixer vessels had a volumetric capacity of 180 ml; the settler vessels, 450 ml. Mixer impellers were 1.0" in diameter and were operated at 1200-1400 rpm. An extraction solution was prepared by dissolving N-ethyl decanohydroxamic acid (20 wt %) in an organic solvent mixture of 90 vol % high flash point kerosene (Norpar 13) and 10 vol % isodecyl alcohol. The extraction solution was 0.733M in extractant and had a density of 0.774 g/ml.

The pH of the plating bath purge (23° C.) was raised from about 7 to 9 with 50% sodium hydroxide and fed at 23 ml/min to the first stage of the extraction section. The flow rate of the organic extraction solution back and forth between the extraction stages and stripping stages was 13.8 ml/min. The stripping solution was 10% sulfuric acid strip acid had a flow rate of 2.02 ml/min to the stripping stage. The solvent extraction unit, operating at the described flow rates, rapidly reached steady state operation, extracting nickel from the plating bath solution for over 11 hours. The efficiency of extracting nickel from a solution of 1300 ppm Ni is illustrated by reference to the nickel concentration of the aqueous raffinate effluent from an extraction mixer-settler stage. The efficiency of stripping nickel from an organic solution is illustrated by reference to the nickel concentration of the aqueous effluent from a stripping mixer-settler stage. Table 1 shows the nickel concentration for the feed stream to the first extraction stage (F), the aqueous raffinate from each of the six extraction stages ($E_n$) and the aqueous effluent from each of the four stripping stages ($S_n$), where n is the stage number.

TABLE 1

| Stage | NICKEL CONCENTRATION (ppm) | |
|---|---|---|
| | Run time (5.6 hr) | Run time (11.5 hr) |
| F | 1300 | 1300 |
| E1 | 36 | 35 |
| E2 | 8.4 | 5 |
| E3 | 2 | 2.3 |
| E4 | 0.87 | 1.24 |
| E5 | 0.45 | 0.75 |
| E6 | — | 0.80 |
| S1 | 19,500 | 30,000 |
| S2 | 14,900 | 6,200 |
| S3 | 1,700 | 3,100 |
| S4 | 1,780 | 1,600 |

EXAMPLE 2

This example illustrates the effectiveness of ion exchange treatment in removing trace levels of nickel remaining in a plating solution after solvent extraction of nickel. Aqueous raffinate from the solvent extraction reported in Example 1, containing about 0.7 ppm nickel, was passed through Amberlite IRC-718 chelating ion exchange resin resulting in an aqueous solution containing plating bath constituents except that the nickel concentration was less than the analytical detection limit of 0.1 ppm.

EXAMPLE 3

This example illustrates the solvent extraction of nickel from a nickel electroless plating bath where the nickel was chelated with lactic acid and stabilized with acetic and propionic acids. The solvent extraction procedure of Example 1 was essentially repeated with the following changes in operating conditions and feed composition:

The plating bath purge feed rate to the first stage of the extraction section was 128 ml/min. The flow rate of the organic extraction solution back and forth between the extraction stages and stripping stages was in the range of 32 to 43 ml/min. the stripping solution of 10% sulfuric acid had a flow rate of 3 to 6.4 ml/min to the stripping stage. The solvent extraction unit, operating at the described flow rates, extracted nickel from the plating bath solution for over 5 hours. The efficiency of extracting nickel from a solution of 1400–1600 ppm Ni is illustrated by reference to Table 2.

TABLE 2

| | NICKEL CONCENTRATION (ppm) RUN TIME (hr) | | |
|---|---|---|---|
| Stage | 3.17 | 4.37 | 5.67 |
| feed | 1400 | 1600 | 1600 |
| E1 | 235 | 190 | 240 |
| E2 | 33 | 26.5 | 30.5 |
| E3 | 12.5 | 8.75 | 9.5 |
| E4 | 7.75 | 4.75 | 11.5 |
| E5 | 4.75 | 3.25 | 3 |
| E6 | 2.6 | 1.8 | 2.2 |
| S1 | 45,000 | 43,500 | 17,500 |
| S2 | 9,600 | 36,000 | 65,000 |
| S3 | 4,800 | 8,500 | 10,600 |
| S4 | 1,000 | 1,400 | 1,500 |
| S4 | 1,000 | 1,400 | 1,500 |

Despite variations in organic and acid flow rates which resulted in transient operations illustrated by the 5.65 hour data, the extraction was operated at steady state for most of the run producing an aqueous nickel sulfate salt concentrated to about 35,000 ppm.

EXAMPLE 4

This example illustrates the solvent extraction of nickel from a nickel electroless plating bath where the nickel was chelated with lactic acid and stabilized with acetic and propionic acids. The solvent extraction procedure of Example 1 was essentially repeated with the following changes in operating conditions and feed composition:

The plating bath purge feed rate to the first stage of the extraction section was 125 ml/min. The flow rate of the organic extraction solution back and forth between the extraction stages and stripping stages was in the range of 32 to 35 ml/min. The stripping solution of 10% sulfuric acid had a flow rate of about 8.5 ml/min to the stripping stage. The solvent extraction unit, operating at the described flow rates, extracted nickel from the plating bath solution for over 5 hours. The efficiency of extracting nickel from a solution of 1400–1600 ppm Ni is illustrated by reference to Table 3.

TABLE 3

| | NICKEL CONCENTRATION (ppm) RUN TIME (hr) | | | |
|---|---|---|---|---|
| Stage | 2.35 | 3.35 | 5.21 | 5.93 |
| F | 3,220 | 3,220 | 3080 | 3080 |
| E1 | 392 | 532 | 574 | 602 |
| E2 | 19 | 25 | 51 | 18 |
| E3 | 2.81 | 2.86 | 2.31 | 2.42 |
| E4 | 1.21 | 1.16 | 1.21 | 1.10 |
| E5 | 1 | 0.66 | 0.83 | 0.77 |
| E6 | 0.72 | 0.50 | 0.77 | 0.60 |
| S1 | 49,000 | 50,400 | 54,600 | 51,800 |
| S2 | 47,600 | 53,200 | 29,400 | 13,720 |
| S3 | 5,880 | 11,200 | 3,640 | 2,660 |
| S4 | 660 | 588 | 520 | 360 |

EXAMPLE 5

This example illustrates the recovery of lactic, acetic and propionic acids from a metal-extracted electroless plating solution containing divalent orthophosphite and sulfate anions. A Zenon Reverse Osmosis unit was fitted with a Filmtec NF-40-2521 filtration membrane. The unit was connected to a re-circulation tank containing 75.7 liters of nickel-depleted plating solution as produced by solvent extraction and ion exchange treatment in the manner of the above Examples 1 and 2. The solution was delivered to the membrane at 225 psi allowing monovalent anions, e.g. hypophosphite, lactate, acetate and propionate anions, to permeate while retaining divalent orthophosphite and sulfate anions. The divalent concentrate was re-circulated to the feed tank. After forty hours of operation, 10.6 liters of permeate was collected. The results of ion chromatography analysis using a DIONEX AS1 anion exchange column are reported in Table 4.

TABLE 4

| RELATIVE ANION CONCENTRATION (uncalibrated area) | | | |
|---|---|---|---|
| | MONO-ANIONS | ORTHOPHOSPHITE | SULFATE |
| Initial feed: | 272 | 505 | 408 |
| Concentrate: | 242 | 421 | 323 |
| Permeate: | 374 | 285 | 233 |

While specific embodiments have been described herein, it should be apparent to those skilled in the art that various modifications thereof can be made without departing from the true spirit and scope of the invention. Accordingly, it is intended that the following claims cover all such modifications within the full inventive concept.

What is claimed is:

1. A method of removing polyvalent borate or orthophosphite anions from an aqueous solution having dissolved metal associated with neutral zwitterions and/or monovalent anions, said method comprising removing substantially all of said metal from said solution by solvent extraction to provide a raffinate solution substantially devoid of said metal, and contacting said raffinate solution with a porous membrane anionically functionalized surface selective to the separation of monovalent anions from polyvalent anions to provide a permeate and residual streams containing said neutral zwitterions and/or monovalent anions wherein said permeate stream is depleted in said polyvalent anions and said residual stream is enriched in said polyvalent anions.

2. A method according to claim 1 wherein said aqueous solution is an electroless nickel plating bath.

3. Apparatus for removing polyvalent borate or orthophosphite anions from an aqueous solution having dissolved metal associated with neutral zwitterions, monovalent anions or a mixture of neutral zwitterions and monovalent anions, said apparatus comprising:

(a) a solvent extraction unit for removing substantially all of said metal from said solution by mixing said aqueous solution with an organic solvent solution containing a substantially water-insoluble metal extractant to effect transfer of said metal to an organic solvent phase and allowing an organic solvent phase to separate from an aqueous raffinate solution substantially devoid of said metal and containing said polyvalent anions, neutral zwitterions and monovalent anions, and (b) a reverse osmosis unit having a selectively anion permeable filtration membrane with an anionically functionalized surface for separating said polyvalent anions from said zwitterions and monovalent anions when said aqueous raffinate solution is contacted with said membrane to provide a permeate stream depleted in said polyvalent anions and a residual stream enriched in said polyvalent anions.

* * * * *